March 20, 1934.    F. R. SCHMITT    1,951,678
LOAF SLICING ATTACHMENT FOR BREAD WRAPPING MACHINES
Filed Nov. 1, 1930

INVENTOR
Frank Reinhold Schmitt
BY Sydney P. Prescott
ATTORNEY

Patented Mar. 20, 1934

1,951,678

UNITED STATES PATENT OFFICE 1,951,678

LOAF-SLICING ATTACHMENT FOR BREAD WRAPPING MACHINES

Frank Reinhold Schmitt, Queens Village, N. Y., assignor to American Machine & Foundry Company, a corporation of New Jersey Application November 1, 1930, Serial No. 492,835

8 Claims. (Cl. 146—98)

This invention relates to loaf-slicing attachments for bread wrapping machines, its main object being to combine a slicing device for cutting a loaf of bread into individual slices with a bread wrapping machine in such a manner that the loaf is sliced while it is being fed to the wrapping mechanism of the machine, without the use of an additional conveyor or other separate holding means to keep the slices together. With this and other objects not specifically mentioned, in view, the invention consists in certain constructions and combinations which will be hereinafter fully described and then specifically set forth in the claims hereunto appended.

In order to produce sliced bread packages, it has heretofore been necessary to first slice the loaves in a separate slicing machine and then to transfer the sliced loaves to a wrapping machine. With the present invention, the loaves placed in an inclined feed chute of the wrapping machine are fed to a conveyor which advances them to the wrapping mechanism and they are sliced before reaching the latter.

The conveyor is equipped with clamp lugs, each pair of which holds a loaf between them and carries it into a cutting box placed directly in the path of a system of revolving disk knives driven by an electric motor. The slicing is accomplished while the conveyor is at rest by swinging the revolving knives about a pivot shaft by suitable means. The knives pass through the loaves alternately from left to right and then, for the succeeding loaf, back again from right to left. After the loaf has been sliced, the conveyor resumes its motion and takes it to the wrapper folding mechanism of the wrapping machine.

In the accompanying drawing which forms a part of this specification and in which like characters of reference indicate the same or like parts:

In carrying the invention into effect, there is provided means for intermittently forwarding loaves of bread endwise, means for transversely slicing the loaves when at rest, and a cutting box for preventing displacement of the loaves while they are being sliced. In the best constructions contemplated, said loaf forwarding means includes an intermittently moving conveyor provided with loaf clamping lugs, and said loaf slicing mechanism includes a swinging frame carrying a plurality of continuously rotating cutters to and fro across the path of the loaves to slice them while they are at rest. In the preferred form of construction said cutting box is slotted to permit said cutters to move through said box to slice the loaves. These various means and parts may be widely varied in construction within the scope of the claims, for the particular machine selected to illustrate the invention is but one of many possible embodiments of the same. The invention, therefore, is not to be restricted to the specific construction shown and described.

Figure 1:
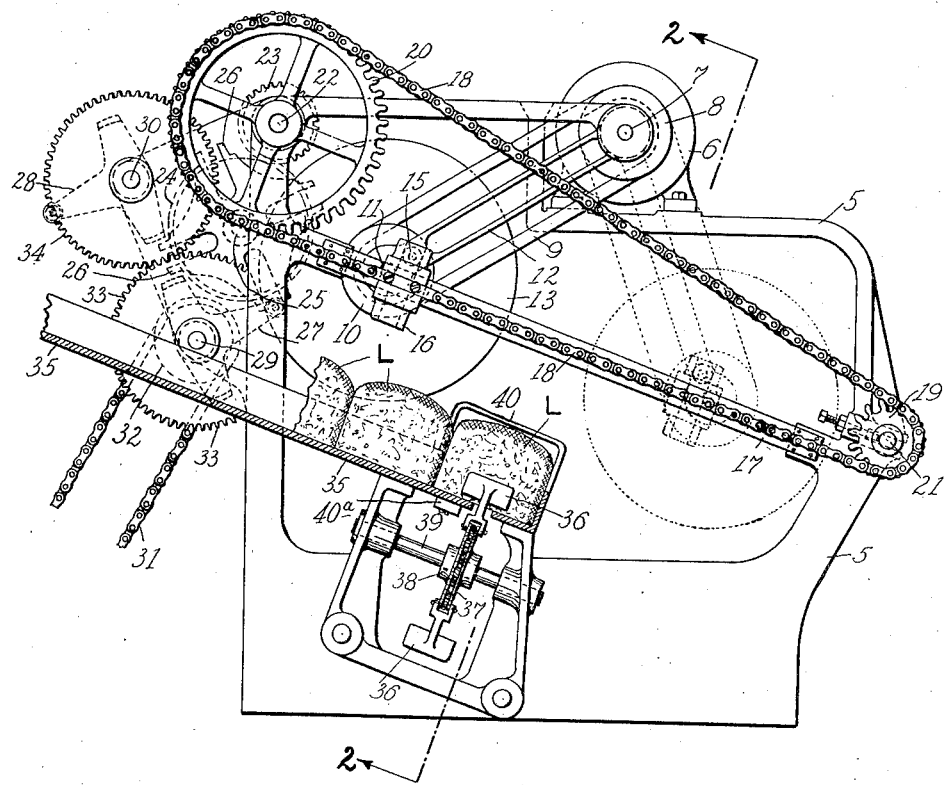
Fig. 1 is a side elevation of the improved slicing attachment.
Figure 2:
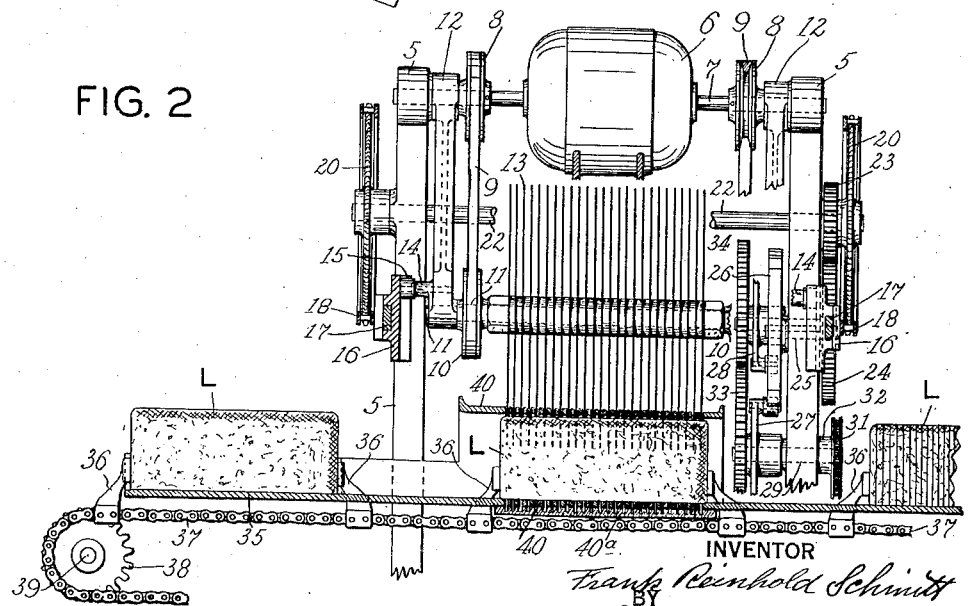
Fig. 2 is a sectional elevation of the same, taken on line 2—2 of Fig. 1.

Referring to Figs. 1 and 2, the slicing attachment consists of a frame 5 carrying a motor 6 equipped with a long drive shaft 7 on which are mounted pulleys 8 which through belts 9 continuously drive pulleys 10 on knife shaft 11 which is loosely mounted in a swingable frame comprising the arms 12 swingably supported by shaft 7 carried in bearings of frame 5. Shaft 11 carries a plurality of circular knives 13 suitably spaced apart to produce slices of the required thickness. The arms 12 are provided with lugs 14 carrying rollers 15 which engage with the track of a guide block 16 slidably supported by guide rods 17 fastened to frame 5.

Guide blocks 16 are supported by chains 18 running over sprockets 19 and 20 mounted on shafts 21 and 22, respectively, supported by frame 5. Shaft 22 carries a gear 23 meshing with a gear 24 on shaft 25 having a Geneva wheel 26. The latter is swung back and forth by means of cranks 27 and 28 on shafts 29 and 30. Shaft 29 is driven through chain 31 and sprocket 32 from the driving mechanism of the wrapping machine. Shaft 29 carries a gear 33 meshing with gear 34 on shaft 30, thus driving the latter in the opposite direction to shaft 29. The cranks 27 and 28 are so arranged that they turn the Geneva wheel 26 one-quarter of a revolution in each direction with a dwell in between, thereby, through gears 24 and 23, moving sprockets 20 and chain 18 back and forth. As the guide blocks 16 are thus moved to and fro by the chains 18, the rollers 15 engaging the guide blocks swing the arms 12 with the knives 13 back and forth across the path of the loaves of bread to slice them.

In the operation of the device, the loaves L arriving at the end of the inclined feed chute 35 are clamped between lugs 36 attached to a crosswise conveyor chain 37 driven intermittently by means, not shown, through a sprocket 38 on shaft 39 in frame 5. As the chain 37 passes over the sprocket 38 each of the clamp lugs 36 extends radially of the sprocket so that the distance between its outer end and the preceding lug on the upper run of the chain is increased sufficiently to permit the leading loaf on the inclined feed chute 35 to enter between each pair of clamp lugs. Since the distance between the adjacent lugs of successive pairs is appreciably less than the length of a loaf it is apparent that the loaves can only enter between clamp lugs of the same pair. After a loaf has entered between a pair of lugs it is clamped in position by the engagement therewith of the outer end of the rear lug when the latter reaches the upper run of the chain. The chain 37 advances the loaves L into the cutting box 40 through the slots of which pass the knives 13 during each of their swings and thereby cut the loaf while it is at rest in the box into the desired number of slices.

The sliced loaves are held by the clamp lugs 36 until they have arrived in the wrapper folding mechanism of the wrapping machine in which the loaves are again held by suitable means until the wrapper is applied. In this manner, the slices are prevented from falling apart during transit in the machine as well as during the wrapping operation without necessitating separate holding means to be applied to the loaves after they have been sliced.

What is claimed is:

1. In a loaf-slicing device for bread wrapping machines, the combination with means for intermittently forwarding loaves of bread endwise, into slicing position of mechanism for transversely slicing one of the loaves into a number of slices simultaneously when at rest and in slicing position, said means including an inclined feed chute and an intermittently moving conveyor chain provided with loaf clamping lugs secured thereto and arranged to receive the loaves from said chute, said lugs being arranged in pairs spaced apart a distance equal to the length of a loaf, and said chute being arranged to deliver a loaf between each pair of lugs.

2. In a loaf-slicing device for bread wrapping machines, the combination with means for intermittently forwarding loaves of bread endwise, of mechanism for transversely slicing the loaves when at rest and a cutting box for preventing displacement of the loaves while they are being sliced, said mechanism including a swingable frame, continuously rotating cutters mounted in said frame, a guide block engaging said frame, a chain carrying said block, and means for moving said chain back and forth, whereby to swing said frame to and fro to slice the loaves.

3. In a loaf slicing device, the combination with means for clamping loaves of bread by their ends and intermittently forwarding them endwise a distance greater than the length of a loaf into slicing position, of mechanism for transversely slicing the loaves when at rest and in slicing position, said means also operating to forward the sliced loaves out of slicing position and hold the slices of each loaf together while it is being forwarded out of slicing position.

4. In a loaf slicing device, the combination with means for clamping loaves of bread by their ends and intermittently forwarding them endwise a distance greater than the length of a loaf into slicing position, of mechanism for transversely slicing the loaves when at rest and in slicing position, said means also operating to forward the sliced loaves out of slicing position and hold the slices of each loaf together while it is being forwarded out of slicing position and including an intermittently moving conveyor chain having pairs of clamping lugs spaced apart a distance equal to the length of a loaf.

5. In a loaf slicing device, the combination with means for clamping loaves of bread by their ends and intermittently forwarding them endwise a distance greater than the length of a loaf into slicing position, of mechanism for transversely slicing the loaves when at rest and in slicing position, and a slotted cutting box for preventing displacement of the loaves while they are being sliced, said means also operating to forward the sliced loaves out of slicing position and hold the slices of each loaf together while it is being forwarded out of slicing position.

6. In a loaf slicing device, the combination with means for clamping loaves of bread by their ends and intermittently forwarding them endwise a distance greater than the length of a loaf into slicing position, of mechanism for transversely slicing the loaves when at rest and in slicing position, and a cutting box for preventing displacement of the loaves while they are being sliced, said mechanism including a swingable frame and spaced rotating cutters mounted on said frame, and said box being slotted to permit the cutters to move therethrough to slice the loaves, said means also operating to forward the sliced loaves out of slicing position and hold the slices of each loaf together while it is being forwarded out of slicing position.

7. Means for slicing loaves of bread comprising a motor, pulleys fixed on the shaft of said motor, swingable arms loosely mounted on the shaft of said motor, a cutter shaft rotatably mounted in said arms, pulleys on said cutter shaft driven from the pulleys on the motor shaft, spaced cutters on said cutter shaft, stationary guide rods, guide blocks slidably mounted on said guide rods and connected to said arms, and means for imparting reciprocating motion to the guide blocks with a dwell at the end of each stroke, whereby a loaf may be placed in position to be sliced during each of said dwells.

8. Means for slicing loaves of bread, comprising a motor, swingable arms loosely mounted on the shaft of said motor, a cutter shaft rotatably mounted in said arms, means for driving said cutter shaft from the motor shaft, spaced cutters on said cutter shaft, a stationary guide rod, a guide block slidably mounted on said guide rod and connected to one of said arms, and means for imparting reciprocating motion to said guide block with a dwell at the end of each stroke whereby a loaf may be placed in position to be sliced during each of said dwells.

FRANK REINHOLD SCHMITT.